Feb. 12, 1935. N. SINCLAIR Re. 19,464

VERTICALLY PIVOTED WALL BED

Original Filed May 1, 1926 2 Sheets-Sheet 1

INVENTOR.
NEIL SINCLAIR
BY Miller & Boykew
ATTORNEYS.

Feb. 12, 1935. N. SINCLAIR Re. 19,464

VERTICALLY PIVOTED WALL BED

Original Filed May 1, 1926 2 Sheets-Sheet 2

INVENTOR.
NEIL SINCLAIR.
BY Miller & Boyken
ATTORNEYS.

Reissued Feb. 12, 1935 Re. 19,464

UNITED STATES PATENT OFFICE 19,464

VERTICALLY PIVOTED WALL BED

Neil Sinclair, Oakland, Calif., assignor to Rip Van Winkle Wall Bed Company, Inc., Oakland, Calif., a corporation of California Original No. 1,793,755, dated February 24, 1931, Serial No. 105,898, May 1, 1926. Application for reissue February 13, 1933, Serial No. 656,558

7 Claims. (Cl. 5—171)

This invention relates to wall beds of the vertically pivoted type and has for its objects improved means for shifting the bed laterally with respect to the wall opening upon swinging the bed from one side of the wall through the opening to the other side of the wall.

Figure 1:
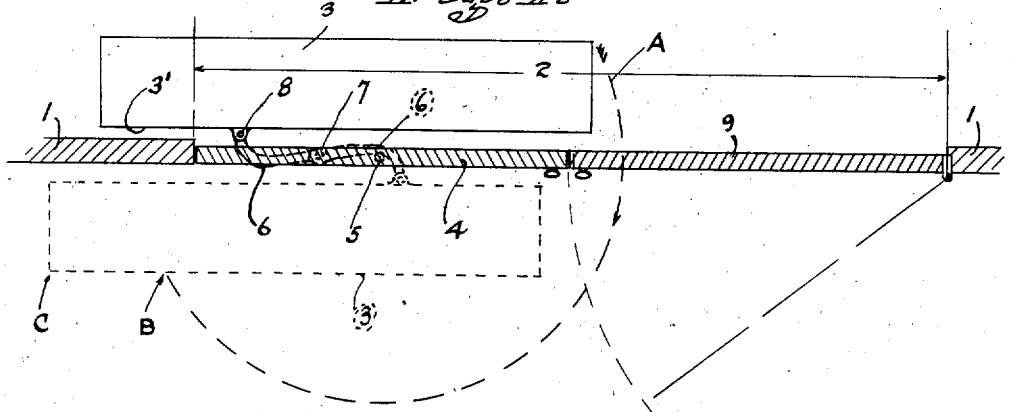
Figure 2:
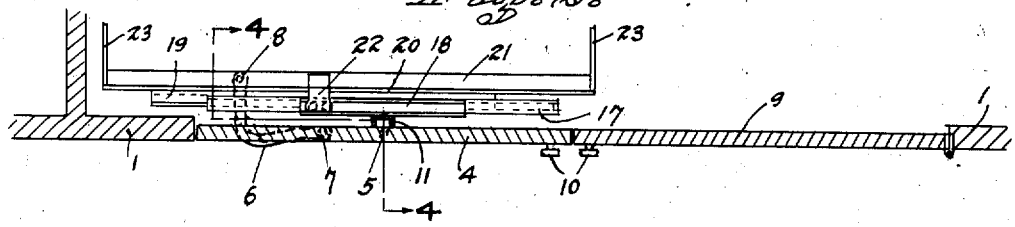
Figure 3:
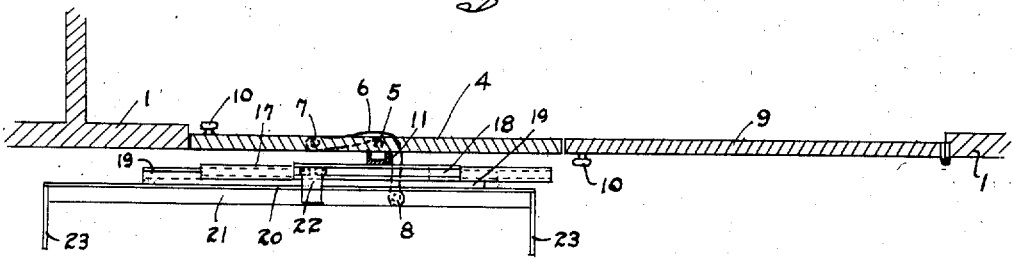
Figure 4:
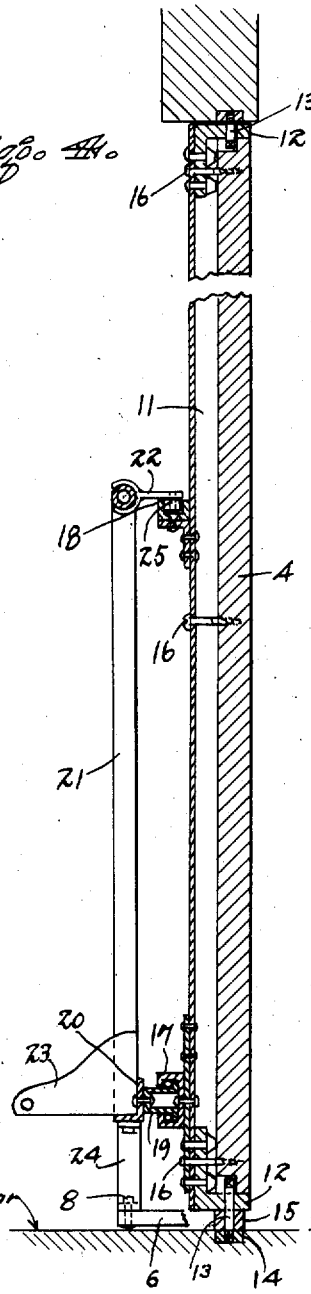
Figure 5:
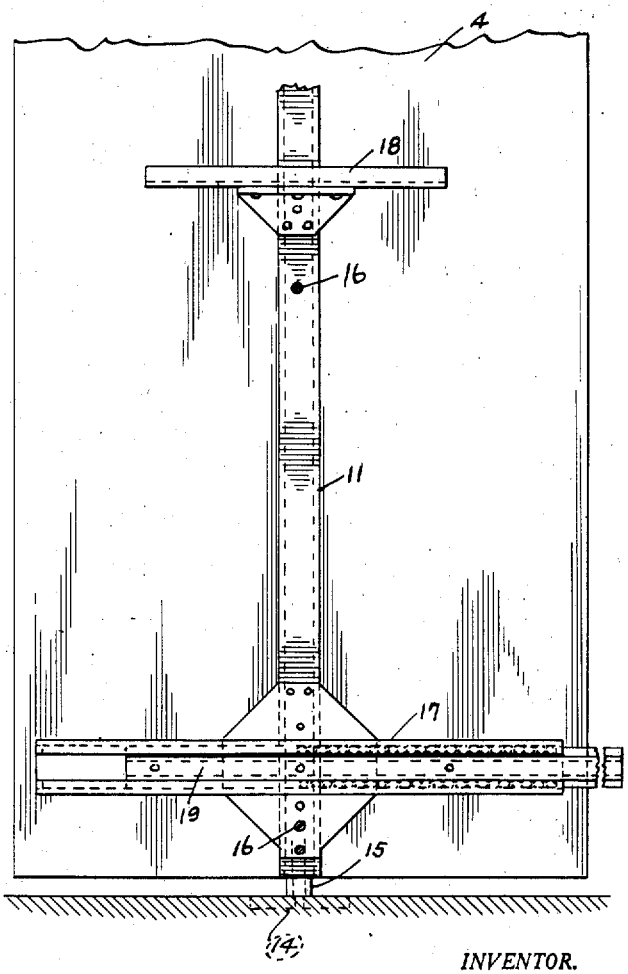

My invention is illustrated in the drawings hereto in which Fig. 1 is a diagrammatic plan showing the action of the shifting mechanism for displacing the bed laterally as it is swung from one side of the wall to the other. Fig. 2 is a plan section of a wall provided with a doorway and with my bed at one side of the wall, while in Fig. 3 is a similar view showing the bed swung to the other side of the wall. Fig. 4 is an enlarged vertical section of the invention as seen from the line 4—4 of Fig. 2 and Fig. 5 is a side view of the lower part of Fig. 4.

Briefly described my invention comprises a wall bed mounted adjacent a doorway in a wall on vertical pivots and supporting a door panel, the bed projecting beyond one side of the doorway along the wall and being swingable on its pivots through the doorway to a position on the opposite side of the wall, the bed being laterally shiftable on its mounting and provided with a lever fulcrumed to some fixed point for bodily shifting the bed as it is swung to maintain its extension along the wall at either side thereof at the same jamb of the doorway.

The door panel revolves with the bed to close the same portion of the doorway at either position of the bed while an auxiliary door provides a passage through the wall at all times and also provides for a relatively narrow panel being carried on the bed mounting by giving clearance space for the bed to swing from one side of the wall to the other.

The diagram in Fig. 1 shows the action without the confusion of unnecessary detail. A wall of a room is shown at 1 and provided with a doorway 2. A vertically positioned wall bed is indicated at 3 and is presumed to be mounted in conjunction with a door panel 4 all carried on vertical pivots at the top and bottom of the doorway at 5. The bed has a relation to the panel 4 so as to project beyond it and extend along the wall at 3′ and while movable with the panel around the vertical axis 5 is also shiftable laterally with respect to the same so that when revolved on its pivots in direction of the arrow the edge A of the bed instead of arriving at the point B when on the other side of the wall may be displaced to the point C.

The shiftable mounting of the bed on its pivotal support may be accomplished in several ways, one of which will be later described, and the shifting of the bed is accomplished while turning the bed from one side of the wall to the other by means of a lever 6 pivoted at 7 to a fixed point (on the floor or lintel) and at 8 to the shiftable bed frame. The fulcrum 7 being displaced to one side of pivot 5 therefore holds the point 8 on the frame always at a given distance from said fulcrum and hence shifts the bed for projection along the wall beyond the same jamb or edge of the doorway with bed at either side of the wall.

An auxiliary door is provided at 9 to afford a closable passage alongside the bed at all times, and also the necessary clearance for the bed to swing—or rather permits the panel 4 to be narrower, for it is evident that with the panel 4 made wider relative to the bed or the bed mounted within its arc of travel, as by moving it slightly to the left in the full line position of Fig. 1, the door 9 could be dispensed with, though the bed is actually wider than that portion of the doorway through which it swings.

It is presumed of course that the bed 3 is a vertically tilted wall bed of the well known type and at either side of the wall, if the size of the room permits, it may be pulled down to a horizontal position for use.

In carrying out my invention the panel 4 and door 9 may be of same size each provided with door knobs or other fitting as at 10 so as to look like a pair of ordinary doors when seen in elevation.

The bed is preferably not carried on the panel 4 but is complete on its own pivotal mounting entirely independent of the door panel and the panel simply supported thereon.

In the disclosure I carry this out by providing a rigid vertical bar such as a tubular or channel iron member 11 to which heavy angle iron ends 12 are riveted to form offset ends and which ends are apertured for the main vertical pivot pins 13 screwed into supporting plates 14 mortised into the floor and lintel respectively, and above the lower one is placed a thrust washer 15 to space the channel from the floor and take the weight of the whole device.

Against this channel is placed the door or panel 4 secured thereagainst by screws as at 16. The panel 4 is notched top and bottom so that the offset angle ends 12 may project across it to come flush with its outer surface and the notches are centrally deepened inside to accommodate the squared heads of the pins 13.

As one means of providing the shiftable mounting of the bed on this pivoted supporting bar 11 I rivet a transversely extending lower guide 17 and preferably also an upper guide 18, thus forming a bed supporting frame or carrier including a pair of horizontal members or tracks upon which the bed is to be rollably supported, and which is accomplished as follows.

The lower guide 17 is provided with an inner ball bearing sliding section 19 riveted in turn to the main angle frame 20 of a folding bed head board or frame 21, while the upper end of the head frame is provided with an arm 22 on which a roller or rollers 25 are mounted so as to roll in the channel guide 18. Thus the bed frame may be rolled or slid laterally back and forth relative to the supporting bar 11 or panel 4 within limits of course as prescribed by the guide construction.

At the lower end of the bed head frame 21 are the usual brackets 23 for pivotally mounting the main body of the bed (not shown) for tipping from horizontal to vertical position in the well known way common to wall beds and forming no part of the present invention.

The shifting lever 6 here shown at the floor, may be at either or both ends of the mounting, and a bracket 24 is extended from the bed frame to provide its pivotal connection 8.

The degree of lateral shifting of the bed may be made any desired amount and depends on the distance of offset of the pivot 7 from the pivot 5, and as more clearly shown in the diagram Fig. 1 the lever is crooked to straddle one of the vertical pivots 5 when the bed is on one side of the wall and lies between said pivot and the door jamb when the bed is on the other side of the wall.

In considering the above description it will be noted that the most important features of the invention are the provision of a vertically pivoted frame, carrier or carriage upon which the bed is rollably mounted so as to roll horizontally back and forth with respect to the pivotal axis, plus a guiding lever or link pivoted to a fixed point and to the bed for forcing and controlling the back and forth rolling of the bed in revolving it on the carrier. Also that while I show rollers and other rolling devices on the bed rolling on the tracks carried by the frame or carrier, it is manifest that it is unimportant on which member the rollers or tracks be supported, also that while I show a single central vertical bar connecting my two horizontal carrier or carriage members 17 and 18, it is immaterial whether there be but one vertical connection between the horizontal members 17, 18 or any number in any disposition so long as the horizontal members are held in rigid relation to one another, but one bar as shown at 11 is the minimum connection which could be used to insure rigidity of the revolving frame or carrier.

I claim:—

1. In a wall bed mounting, a vertically disposed supporting bar with its ends offset and adapted to be vertically pivoted to a building in a doorway wall opening, a bed frame, means supporting the bed frame on said bar in a manner to be laterally shiftable with relation thereto, and lever means operated upon swinging the bar on its pivots arranged for so shifting said bed.

2. In a wall bed mounting, a vertically disposed supporting bar with its ends offset and adapted to be vertically pivoted to a building in a door-way wall opening, a bed frame, means supporting the bed frame on said bar in a manner to be laterally shiftable with relation thereto, and lever means operated upon swinging the bar on its pivots arranged for so shifting said bed, and a door panel detachable secured to said bar for pivotal swinging therewith.

3. In a wall bed mounting, a vertically disposed supporting bar with its ends offset and adapted to be vertically pivoted to a building in a door-way wall opening, a bed frame, means supporting the bed frame on said bar in a manner to be laterally shiftable with relation thereto, and lever means connected to the bed and operable by swinging the bar on its pivots to shift the bed laterally with respect thereto, the shiftable mounting of the bed on the bar including a horizontally disposed guide secured to the bar and upon which guide the bed is supported with freedom for movement therealong.

4. In a device of the class described, a door, means for which the door is mounted to rotate on a vertical axis, a folding bed of greater width than the door, means by which the bed is mounted on the door for lateral movement relative thereto, one edge of said bed positioned within the adjacent edge of said door, and a link pivotally mounted on the bed and mountable at its other end on an immovable support, said link when so mounted serving to so guide the bed when rotated with the door that when the door has been rotated through 180° that edge of the bed opposite to the first mentioned edge will be positioned within the edge of the door adjacent thereto.

5. In a device of the class described, a door, means by which the door is mounted to rotate on a vertical axis corresponding substantially with the center line of the door, a folding bed of greater width than the door means by which the bed is mounted on one side of the door for lateral shifting movement relative thereto, one edge of the bed positioned within the adjacent edge of the door, and a link pivotally mounted on said bed and mountable at its other end on a fixed support, said link when so mounted serving to so guide the bed when rotated with the door that when the door has been rotated through 180° that edge of the bed opposite to the first mentioned edge will be positioned within the edge of the door adjacent thereto.

6. A wall bed comprising a vertically disposed carrier frame provided with vertically spaced offset portions; means vertically pivoting said carrier frame on said offset portions to a building in a doorway wall opening to swing through the doorway to reverse position, a bed, means mounting and wholly supporting said bed on one side of said carrier frame in a manner to be laterally shiftable thereon along a line parallel therewith, said bed arranged to overlap the wall beyond one jamb of the doorway, and means for automatically shifting said bed on said carrier frame as the same is reversed on its pivots so as to project the bed beyond the same jamb of the doorway in overlapping relation with the opposite side of the wall.

7. A wall bed comprising a vertically disposed carrier frame provided with vertically spaced offset pivot portions and vertically spaced horizontal members, means vertically pivoting said carrier frame on said offset portions to a building in a doorway wall opening to swing through the doorway to reverse position, a bed, means rollably mounting and wholly supporting said bed on said horizontal members at one side of said carrier frame in a manner to be laterally rollable thereon along a line parallel therewith, said bed arranged to extend beyond one jamb of the doorway along the wall, and lever means pivoted to a fixed support and to the bed arranged for automatically rolling said bed along said horizontal members as the carrier frame is reversed on its pivots so as to project the bed beyond the same jamb of the doorway along the opposite side of the wall.

NEIL SINCLAIR.